(12) United States Patent
Lundgren et al.

(10) Patent No.: US 11,164,199 B2
(45) Date of Patent: Nov. 2, 2021

(54) UPDATING PROJECTIONS USING LISTING DATA

(71) Applicant: Opendoor Labs Inc., San Francisco, CA (US)

(72) Inventors: David Makanalani Lundgren, San Francisco, CA (US); Dale Yut Jung Everett, San Francisco, CA (US); Carolina Marquez, San Francisco, CA (US); David Anthony Sinsky, Oakland, CA (US); Leonid Boris Pekelis, San Francisco, CA (US); Jae Hyun Kim, San Francisco, CA (US); Nelson Chan Ray, San Francisco, CA (US)

(73) Assignee: Opendoor Labs Inc., San Francisco, CA (US)

( * ) Notice: Subject to any disclaimer, the term of this patent is extended or adjusted under 35 U.S.C. 154(b) by 393 days.

(21) Appl. No.: 16/216,645

(22) Filed: Dec. 11, 2018

(65) Prior Publication Data
US 2020/0034861 A1 Jan. 30, 2020

Related U.S. Application Data

(60) Provisional application No. 62/703,650, filed on Jul. 26, 2018.

(51) Int. Cl.
*G06Q 30/02* (2012.01)
*G06N 20/00* (2019.01)
*G06Q 50/16* (2012.01)

(52) U.S. Cl.
CPC ......... *G06Q 30/0206* (2013.01); *G06N 20/00* (2019.01); *G06Q 30/0201* (2013.01); *G06Q 50/16* (2013.01)

(58) Field of Classification Search
CPC ............... G06Q 30/0206; G06Q 50/16; G06Q 30/0201; G06N 20/00
(Continued)

(56) References Cited

U.S. PATENT DOCUMENTS 5,361,201 A * 11/1994 Jost ........................ G06Q 40/00
705/35
10,055,788 B1 * 8/2018 Tatang ................... G06Q 40/06
(Continued)

OTHER PUBLICATIONS

Junker, Brian. "Logistic Regression and Logit Models." Accessed via Wayback Machine: https://web.archive.org/web/20140514033226/http://www.stat.cmu.edu/~brian/720/week06/09-logistic.pdf [May 14, 2004]. Link: http://www.stat.cmu.edu/~brian/720/week06/09-logistic.pdf (Year: 2014).*

(Continued)

*Primary Examiner* — Sarah M Monfeldt
*Assistant Examiner* — John S. Wasaff
(74) *Attorney, Agent, or Firm* — Schwegman Lundberg & Woessner, P.A.

(57) ABSTRACT

Systems and methods are disclosed for automatically projecting a number of days to pending for a real-estate property by receiving, by a server, real-estate property listing information of real-estate property activities associated with a plurality of real-estate properties and determining, for each of the plurality of real-estate properties, a days to pending amount indicating time between when a respective one of the plurality of real-estate properties was listed and when the respective real-estate property was sold. The systems and methods further train a machine learning technique to establish a relationship between the different types of real-estate property activities and the determined days to pending amounts. The trained machine learning technique is applied to new real-estate property activities associated with a new real-estate property to predict a length of time between a first (Continued)

time the new real-estate property was listed and a second time when the new real-estate property will be sold.

20 Claims, 7 Drawing Sheets

(58) Field of Classification Search
USPC .......................................................... 705/313
See application file for complete search history.

(56) References Cited

U.S. PATENT DOCUMENTS

| | | | | |
|---|---|---|---|---|
| 2008/0097767 | A1* | 4/2008 | Milman | G06Q 30/02 705/1.1 |
| 2011/0004560 | A1* | 1/2011 | Knake | G06Q 50/16 705/313 |
| 2012/0323587 | A1* | 12/2012 | Llosa | G06Q 50/16 705/1.1 |
| 2013/0262186 | A1* | 10/2013 | Lazarre | G06Q 50/16 705/7.35 |
| 2015/0242747 | A1* | 8/2015 | Packes | G06Q 50/16 706/17 |
| 2015/0356576 | A1* | 12/2015 | Malaviya | G06Q 30/0202 705/7.31 |
| 2016/0162986 | A1* | 6/2016 | Ghosh | G06Q 40/00 705/35 |
| 2017/0132528 | A1* | 5/2017 | Aslan | G06N 20/00 |
| 2018/0107923 | A1* | 4/2018 | Benson | H04W 12/03 |
| 2018/0300342 | A1* | 10/2018 | Hundley | G06F 16/9535 |
| 2019/0005516 | A1* | 1/2019 | Spath | G06Q 30/0201 |

OTHER PUBLICATIONS

Ermolin, Sergey V. "Predicting Days-on-Market for Residential Real Estate Sales." (2016). (Year: 2016).*

Shinde et al. (Jun. 2018). Valuation of Home Prices Using Predictive Techniques. International Journal of Advances in Electronics and Computer Science, vol. 5, Issue-6, Jun. 2018. http://www.iraj.in/journal/journal_file/journal_pdf/12-477-153396274234-40.pdf (Year: 2018).*

* cited by examiner

UPDATING PROJECTIONS USING LISTING DATA

CROSS-REFERENCE TO RELATED APPLICATION

This application claims the benefit of priority of David Makanalani Lundgren et al., U.S. Provisional Patent Application No. 62/703,650, entitled "UPDATING PROJECTIONS USING LISTING DATA," filed on Jul. 26, 2018, the entirety of which is hereby incorporated by reference herein.

BACKGROUND

The length of time a given real-estate property takes to sell depends on a variety of factors. The decisions a seller of the real-estate property makes concerning sale of the real-estate property heavily depend on how long the seller expects the real-estate property to remain on the market. Sellers typically spend a great deal of resources analyzing sales of similar properties in the seller's market to estimate how long the seller's property will take to sell. Such tasks, however, are typically very time consuming and ultimately end up being inaccurate which result in sellers making poor decisions concerning the real-estate property sale.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
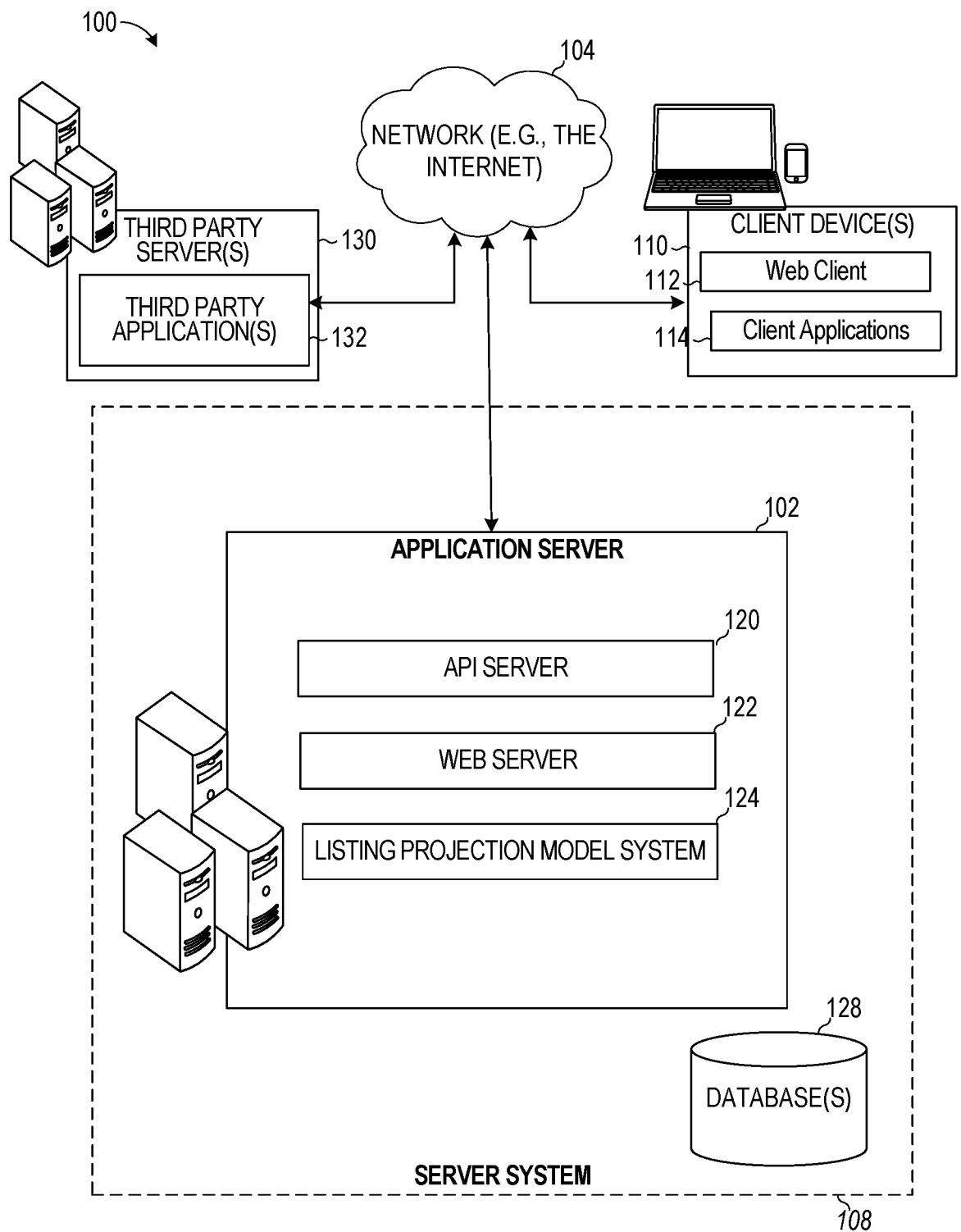
FIG. 1 is a block diagram illustrating a networked system for projecting a number of days to pending for a real-estate property, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Accurately determining how long a given real-estate property will take to sell after being listed for sale is key to performing real-estate property transactions. For example, a seller estimates how long the property will take to sell to set the indifference price during negotiations. Particularly, if the seller believes the property will take a long time to sell, the seller may decide to accept a lower offer to purchase the property now rather than waiting the full term of the estimated amount of time the property will take to sell. As another example, a seller estimates how long the property will take to sell to triage homes during resale and avoid poor home performance. Inaccurately determining how long a given property will take to sell can result in lost profits for a seller, delay in negotiations and selling of a property, and can even impact selling decisions other property owners make.

As referred to herein, listing a real-estate property means publicly announcing the availability of a given real-estate property for purchase (announcing that a property is being put on sale). The public announcement may take various forms including posting pictures and/or details on one or more websites, newspapers, listing databases, communicating the offer for sale to one or more real-estate brokers or any other means to inform an interested party that the property is available for sale. The amount of time it takes to sell a given property measured from the date the property is first listed for sale to the date a contract to purchase the property is executed (or the closing date) is referred to as the "days to pending" time, amount or period. The days to pending amount may be provided as any interval or combination of intervals of time including number of days, weeks, months, years, seconds, minutes, hours, and so forth.

The systems available for determining how long a given real-estate property will take to sell require a seller to manually analyze various country- or jurisdiction-based statistics. For example, existing systems provide information on how long different homes took to sell in different places and then the seller uses this information to estimate that the seller's property will likely sell in the same timeframe. But the statistics in these systems simply represent trends and averages that are not regularly updated and are simply determined based on a comparison of listing versus closing dates. The amount time properties took to sell provided in these systems does not represent other factors that may have impacted how long the properties took to sell. As such, relying on these statistics to estimate how long a given property will take to sell, results in determining an under- or over-estimated fixed length of time it will take a seller to sell a property that does not consider other factors (e.g., how many people are visiting the property and how long people spend during a given visit) that come up during the sale process. Namely, because the statistics are not regularly updated and do not represent sale conditions specific to different properties, the length of time the seller typically estimates for how long it will take to sell the property is not generally accurate or revisited and adjusted during the sale process.

The disclosed embodiments improve the efficiency and accuracy of determining how long it will take to sell a given real-estate property by training a machine learning technique (or machine learning model) to establish a relationship between different types of known real-estate property activities and known days to pending amounts of each property. The trained machine learning technique is then applied to new real-estate property activities associated with a new real-estate property allowing the disclosed embodiments to accurately predict a length of time between a first time the new real-estate property was listed and a second time when the new real-estate property will be sold (e.g., to predict the days to pending amount for a new property). The prediction of the days to pending amount for a new real-estate property is performed with minimal user input (e.g., without the user having to manually analyze country wide or jurisdiction specific trends and statistics) and can be adjusted in real-time as different factors or activities impacting the days to pending amount are identified by the machine learning technique. This significantly reduces the amount of research and time a user needs to spend estimating the days to pending amount and increases the overall accuracy of how long a given property will take to sell. This provides real-estate property buyers and sellers with a days to pending amount quickly and efficiently and avoids potential negative consequences resulting from mistakenly or inaccurately relying on statistics to estimate how long a real-estate property will take to sell.

According to some embodiments, real-estate property listing information representing different types of real-estate property activities (e.g., a number of agent visits per day, a number of offers per visit, a number of views per day, a number of non-agent visits per day, a number of dislikes per view, a number of loss views per day, a visit duration, number of agent versus non-agent offers, or an amount of a given offer) associated with a plurality of real-estate properties is received by a server. A days to pending amount indicating a measure of time between when a respective one of the plurality of real-estate properties was listed and when the respective one of the plurality of real-estate properties was sold is determined for each of the plurality of real-estate properties. A machine learning technique (e.g., a machine learning model) is trained, by the server, to establish a relationship between the different types of real-estate property activities and the determined days to pending amounts, wherein the trained machine learning technique is applied to new real-estate property activities associated with a new real-estate property to predict a length of time between a first time the new real-estate property was listed and a second time when the new real-estate property will be sold. For example, a log odds linear model can be trained to estimate various coefficients using logistic regression that represent a relationship between known days to pending amounts and a known set of activities. Once the various coefficients are estimated, the log odds linear model can be applied to a new set of activities corresponding to the known set of activities to predict the days to pending amount for the new set of activities. In some implementations other types or combinations of linear and non-linear machine learning techniques can be used such as linear regression, random forests, decision tree learning, neural networks, deep neural networks, and so forth.

Disclosed techniques of making a prediction of the days to pending amount for a given real-estate property available to a given entity, buyer or seller provides a number of benefits including indifference pricing, price optimization, and worrisome home triage. Specifically, such a prediction allows a seller to make better decisions during negotiations and provides more accurate, and earlier indicators of worse than expected resale results for a property avoiding poor home performance before it happens. Providing an accurate days to pending amount for a property (e.g., using post listing features or real-estate activities) can reveal properties at risk of becoming long days on the market (DOM) before it happens. For example, a home may be deemed unexpectedly worrisome if the prediction provided by the machine learning technique of how long the property will take to sell changes increases over time. As a result of determining that a home is taking longer to sell than predicted, the system can automatically flag the real-estate property for review or automatically adjust the sale price.

FIG. 1 is a block diagram illustrating a networked system 100, according to some example embodiments, configured to project a number of days to pending for a real-estate property. The system 100 includes one or more client devices such as client device 110. The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user that is used to access and utilize home buying services (e.g., request a days to pending amount to be predicted for a given real-estate property). For example, the client device 110 may be used to input information to request an automated offer on a subject real-estate property, to request a value of a subject real-estate property, to request one or more real-estate property transaction documents to be automatically selected and populated, to request a days to pending amount to be computed, to make an offer on a subject real-estate property, to receive and display various information about a subject real-estate property or a market, to view different real-estate property transaction documents needed in different jurisdictions, to preview real-estate property documents that are automatically created, and so forth.

For example, client device 110 is a device of a given user who would like to sell his or her subject real-estate property. Client device 110 accesses a website of the home buying and selling service (e.g., hosted by server system 108). The user inputs an address of the subject real-estate property and selects an option to receive an automated offer or value of the subject real-estate property in the website. Server system 108 receives the request and identifies comps (e.g., a plurality of real-estate properties) having similar attributes as the subject real-estate property. Server system 108 automatically retrieves characteristics of the subject real-estate property based on the address and search for comps within a predetermined distance (e.g., 1.2 miles) of the address of the subject real-estate property. Server system 108 then automatically computes a value for the subject real-estate property and provides the value to the client device 110 instantly or after a period of time (e.g., 24 hours). In some circumstances, server system 108 involves an operator of a website of the home buying and selling service using an operator device to review the value that was automatically computed before the value is returned to the client device 110. Client device 110 receives the value and provides an option to the user to complete the real-estate property transaction. For example, the user selects an option to complete the sale of the real-estate property. In response, server system 108 automatically generates one or more real-estate property transaction documents (e.g., a contract for sale of the subject real-estate property) and allows the user to execute the documents to complete the sale. After the user executes the documents the subject real-estate property enters a pending status. Server system 108 may present a list of available closing dates to the user. Once the user selects the closing date, the subject real-estate property closes at the contract price on the closing date.

As another example, client device 110 is a device of a given user who would like to conduct a real-estate property transaction and receive a predicted days to pending amount for the property. The user accesses the server system 108 via client device 110. Server system 108 presents to the user at the client device 110 a user interface that allows the user input information that identifies the real-estate property (e.g., an address of the property and/or MLS listing identifier of the property). Server system 108 retrieves a machine learning technique that has been previously trained to predict a days to pending amount based on training data including established relationships of real-estate activities of properties in the jurisdiction and their corresponding days to pending amounts. Server system 108 identifies one or more real-estate property activities (e.g., a number of weeks on the market, a listing date, a number of agent and non-agent visits, a number of other similar properties available for sale, etc.) associated with the real-estate property identified or selected by the user. Server system 108 applies the retrieved machine learning technique to the identified one or more real-estate property activities to predict a days to pending amount for the identified or selected real-estate property. Once the days to pending amount for the identified or selected real-estate property is predicted, server system 108 transmits the prediction to the user at client device 110 (e.g., by email, instant message, stored folder or any other means). The process for training a machine learning technique to predict a days to pending amount and the process for applying the machine learning technique that has been trained to a new real-estate property are discussed below in connection with FIGS. 3-5.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, an online home buying and selling application, a real estate application, and the like.

In some embodiments, one or more client applications 114 are included in a given one of the client device 110, and configured to locally provide the user interface and at least some of the functionalities, with the client application 114 configured to communicate with other entities in the system 100 (e.g., third-party servers 130, server system 108, etc.), on an as-needed basis, for data and/or processing capabilities not locally available (e.g., to access location information, to access market information related to homes, to authenticate a user, to verify a method of payment, etc.). Conversely, one or more applications 114 may not be included in the client device 110, and then the client device 110 may use its web browser to access the one or more applications hosted on other entities in the system 100 (e.g., third-party servers 130, server system 108, etc.).

A server system 108 provides server-side functionality via the network 104 (e.g., the Internet or wide area network (WAN)) to one or more third-party servers 130 and/or one or more client devices 110. The server system 108 includes an application program interface (API) server 120, a web server 122, a listing projection model system 124, that may be communicatively coupled with one or more databases 128. The one or more databases 128 may be storage devices that store data related to users of the system 108, applications associated with the system 108, cloud services, housing market data, one or more machine learning techniques and so forth. The one or more databases 128 may further store information related to third-party servers 130, third-party applications 132, client devices 110, client applications 114, users, and so forth. In one example, the one or more databases 128 may be cloud-based storage.

In one example, the one or more databases 128 may be cloud-based storage. The one or more databases 128 may store real-estate property activity information including any one or more of number of agent visits per day, number of offers per visit, number of views per day (which can be based on a mobile computing platform used by the user to view the listing (e.g., iOS versus Android)), number of non-agent visits per day, number of dislikes per view, number of loss views per day, visit duration, number of agent versus non-agent offers, amount of a given offer, or any other information associated with a real-estate property listing (e.g., original list price (the price initially posted in the real-estate listing), original list price squared, hot zip code (representing a ranking of a list of zip codes where property sales are frequent), cold zip code (representing a ranking of a list of zip codes where property sales are infrequent), age of the property (e.g., whether the property is less than one year old, between 1 and 5 years old, between 5 and 10 years old or greater than 10 years old), length of time on the market before being sold (e.g., one week, two weeks, 4-8 weeks, or more than 8 weeks), price drop in a past week, discount from original list price (e.g., todays list price versus original list price), whether the property is hosted by server system 108 or hosted by a public real-estate server (e.g., MLS server 130), property specific attributes (e.g., whether the property is on a busy road, a parking lot, a golf course, etc.). A first portion of the information contained in databases 128 may be publicly available (e.g., via third party servers 130) and a second portion of the information contained in databases 128 may only be available internally to server system 108 (and specifically to listing projection model system 124).

The number of agent visits per day represents a number of real-estate brokers that physically visit a given real-estate property that is available for sale on a given day. Server system 108 may compute the number of agent visits per day in accordance with: sum(number of real-estate brokers that visit physically the property in a given week)/sum(number of days on the market in the given week—days since the property was listed in the given week). To perform this computation, a mobile computer may be physically located in the property that is listed for sale. As people come to physically visit the property, the people can input generic information such as their name and whether or not they are real-estate brokers and the date. This information is then sent from the mobile computer to the server system 108 along with a listing identifier or property identifier. Server system 108 then updates a running count of the number of agent (e.g., broker) and non-agent visitors that physically visit the property. Server system 108 also accesses information associated with the property including a date when the property was listed for sale in order to compute the number of agent visits per day. For example, server system 108 computes the number of agent visits per day for a given property based on a ratio of a total number of times one or more entities who are real-estate property brokers physically visit a given one of the plurality of real-estate properties and an amount of time elapsed since the given real-estate property was listed.

The number of non-agent visits per day represents a number of entities or people that are not real-estate brokers that physically visit a given real-estate property that is available for sale on a given day. Server system 108 may compute the number of non-agent visits per day in accordance with: sum(number of non-real-estate brokers that visit physically the property in a given week)/sum(number of days on the market in the given week—days since the property was listed in the given week). Server system 108 computes the number of non-agent visits per day in a similar manner as the number of agent visits per day.

The number of offers per visit represents a ratio of the number of offers to purchase the given real-estate property and the number of people that physically visited the property. Server system 108 may compute the number of offers per visit in accordance with: sum(number of offers in a given week)/sum(number of agent visits+number of non-real-estate broker visits in the given week). In some implementations, server system 108 access an MLS server 130 to obtain offer information about a given property. Server system 108 uses the offer information (e.g., the number of offers submitted for a given property listing) along with the total number of visits, determined using the mobile computer that people who visit the property use to input information for server system 108 to track how many people visit the property, to compute the number of offers per visit. For example, server system 108 computes a number of offers per visit for each of the plurality of real-estate properties based on a ratio of a total number of offers to purchase a given one of the plurality of real-estate properties and a total number of times one or more entities physically visit the given real-estate property.

The number of views per day represents the number of people that accessed the publicly available real-estate listing through one or more websites. Server system 108 tracks IP numbers of the computers used to view the listing for a given property. Server system 108 accumulates the number of distinct IP numbers on a given day to compute the number of views on a given day.

The number of dislikes per view represents how many people select an option on the listing website indicating a level of dislike for the property. Server system 108 computes the number of dislikes per view by dividing the number of times a dislike option was selected for a given listing by the number of views per day.

The number of loss views per day indicates how many less people on each given day relative to a previous day are visiting the listing via the website. Server system 108 computes the number of loss views per day by comparing the number of distinct IP numbers that are detected that access a webpage that includes a listing for a given property on a given day with the number of distinct IP numbers that are detected on an adjacent next day. The difference in the two numbers of distinct IP numbers is provided and stored as the number of loss views per day.

The visit duration represents a length of time spent by a given entity or person physically visiting the real-estate property. In some implementations, after a given person finishes visiting a given property or physically leaves the property, the person inputs the time they left into the mobile computer at the property location. The mobile computer computes a difference between the time the person entered the property and the time the person left to provide to server system 108 the visit duration for a given person. In some implementations, server system 108 computes an average of the visit durations of each person who physically visited the property as the visit duration. The number of agent versus non-agent offers represents how many offers to purchase the property were received from real-estate brokers and how many were received from non-real-estate brokers. The amount of a given offer represents the dollar or currency value that a buyer is willing to pay for the given property.

The server system 108 may be a cloud computing environment, according to some example embodiments. The server system 108, and any servers associated with the server system 108, may be associated with a cloud-based application, in one example embodiment.

The server system 108 includes a listing projection model system 124. Listing projection model system 124 includes one or more modules, storage devices and databases. The storage devices in listing projection model system 124 store various real-estate property activities and one or more machine learning techniques for predicting a days to pending amount. The modules in listing projection model system 124 are configured to train a machine learning technique to predict a days to pending amount for a given real-estate property by establishing relationships between known real-estate property activities and known days to pending amounts of various real-estate properties. The details of the listing projection model system 124 are provided below in connection with FIG. 2.

The system 100 further includes one or more third-party servers 130. The one or more third-party servers 130 may include one or more third-party application(s) 132. The one or more third-party application(s) 132, executing on third-party server(s) 130, may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party website or application 132, for example, may provide software version analysis functionality that is supported by relevant functionality and data in the server system 108.

Third-party servers 130 may include a multiple listing service (MLS) server. This service is publicly accessible to real-estate brokers nationwide. A real-estate broker inputs property information to the MLS server (e.g., price information, property attributes, listing date of a property, date contract to sell the property was executed, closing date of the property, etc.) to list the property for sale and to complete transactions for the property. Other brokers can access the MLS server to search and filter properties available for sale or that have been sold and select a given property to view.

The MLS server may allow a real-estate broker to provide an offer to purchase a given property being listed for sale on behalf of a buyer. The MLS server may indicate whether and when a given property listing is pending indicating that an executed purchase and sale agreement between a buyer and seller of the real-estate property has been received. The MLS server may indicate whether and when a sale for a given property has been closed indicating that the legal transfer of title to the property from the seller to the buyer has been recorded in a government database.

The MLS server may include a database of real-estate properties. Characteristics of each property stored in the MLS server may also be provided. Characteristics include a location of the property, a school district, a tax rate, a home owners association rate, interior conditions (e.g., whether the property has been renovated, whether the property has stainless steel appliances, whether the property has a pool, whether the property has granite countertops), whether the property is characterized as new construction, whether the property has previously been occupied, and so forth. The information of the MLS server may be included as part of database 128. The MLS real-estate properties information may be used to search for comps to automatically determine a value of a subject real-estate property. The MLS real-estate properties information may include real-estate property activities and may be used to train a machine learning technique to establish a relationship between the known real-estate property activities and the known days to pending of each corresponding real-estate property.

Figure 2:
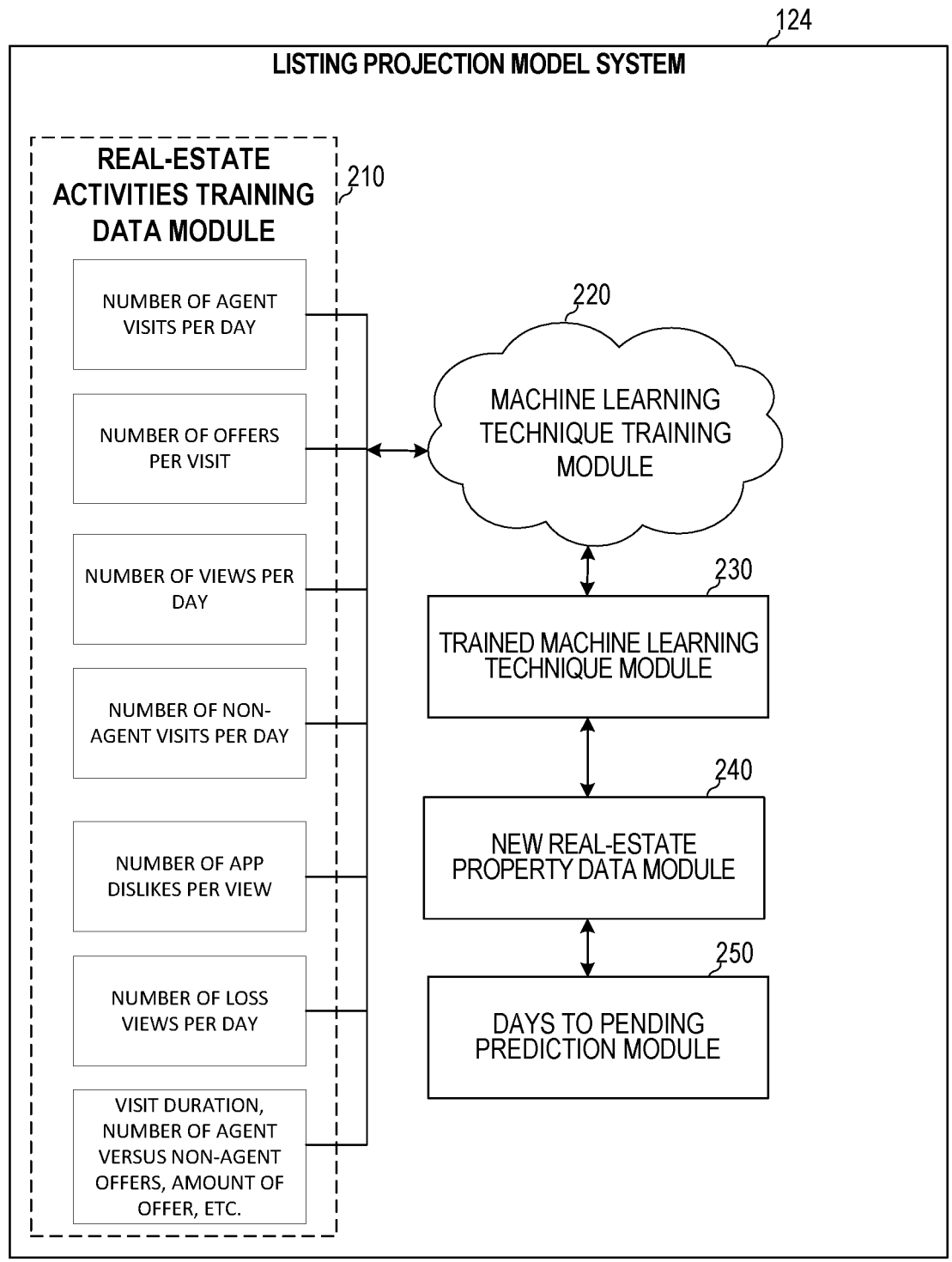
FIG. 2 illustrates a real-estate property listing projection model system, according to some example embodiments.

FIG. 2 illustrates a listing projection model system 124, according to some example embodiments. Listing projection model system 124 includes a real-estate activities training data module 210, a machine learning technique training module 220, a trained machine learning technique module 230, a new real-estate property data module 240, and a days to pending prediction module 250. In some implementations, some modules of listing projection model system 124 may be implemented on server system 108 and others may be implemented on third party servers 130. In some implementations, all of the modules of listing projection model system 124 are implemented on server system 108 or on third party servers 130. In such cases, server system 108 communicates information to third party servers 130 based on the modules implemented and vice versa.

Real-estate activities training data module 210 includes a list of real-estate property activities associated with various real-estate properties that have been previously sold. The real-estate property activities are obtained by real-estate activities training data module 210 from database 128 and/or from third party server 130. For example, real-estate activities training data module 210 obtains the number of agent visits per day from database 128 and obtains the number of app dislikes per view from third party server 130 (e.g., a website that hosts listings for real-estate properties). In some implementations, real-estate activities training data module 210 provides any one of the real-estate property activities using one or more machine learning techniques. For example, a previously trained machine learning technique may be configured to provide the number of agent visits per day for a given property to be used as training data to train the machine learning technique training module 220.

Machine learning technique training module 220 is trained to predict a days to pending amount for a given real-estate property by establishing a relationship between one or more known real-estate property activities provided by real-estate activities training data module 210 and the corresponding days to pending amount provided by real-estate activities training data module 210.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., real-estate property activities and known days to pending amounts) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for predicting a days to pending amount for a given property.

The machine-learning algorithms utilize features (e.g., real-estate activities for various real-estate properties) for analyzing the data to generate assessments (e.g., a days to pending amount relationship to the real-estate activities). A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features may be of different types and may include one or more of number of agent visits per day, number of offers per visit, number of views per day (which can be based on a mobile computing platform used by the user to view the listing (e.g., iOS versus Android)), number of non-agent visits per day, number of dislikes per view, number of loss views per day, visit duration, number of agent versus non-agent offers, amount of a given offer, or any other information associated with a real-estate property listing (e.g., original list price (the price initially posted in the real-estate listing), original list price squared, hot zip code (representing a ranking of a list of zip codes where property sales are frequent), cold zip code (representing a ranking of a list of zip codes where property sales are infrequent), age of the property (e.g., whether the property is less than one year old, between 1 and 5 years old, between 5 and 10 years old or greater than 10 years old), length of time on the market before being sold (e.g., one week, two weeks, 4-8 weeks, or more than 8 weeks), price drop in a past week, discount from original list price (e.g., todays list price versus original list price), whether the property is hosted by server system 108 or hosted by a public real-estate server (e.g., MLS server 130), property specific attributes (e.g., whether the property is on a busy road, a parking lot, a golf course, etc.).

The machine-learning algorithms utilize the training data to find correlations among the identified features that affect the outcome or assessment (e.g., the days to pending amount associated with the property corresponding to the features). In some example embodiments, the training data includes labeled data, which is known data for one or more identified features and one or more outcomes, such as the days to pending amount.

Once the training data are collected and processed, machine learning technique training module 220 model can be built using either statistical learning or machine learning techniques. In one embodiment, regression analysis can be used to build the machine learning technique training module 220 model. Regression analysis is a statistical process for estimating the relationships among variables. There are a number of known methods to perform regression analysis, for example: linear regression or ordinary least squares regression, among others, are "parametric" in that the regression function is defined in terms of a finite number of unknown model parameters that can be estimated from training data. For days to pending prediction, a regression model (e.g., Equation 1) can be defined, for example, as:

$$H = f(X, \beta), \quad \text{(Equation 1)}$$

where "H" denotes the known days to pending amount for a set of properties, "X" denotes a vector of input variables (e.g., any one of the real-estate activities associated with the set of properties), and "β" denotes a vector of unknown parameters to be determined or trained for the regression model.

The training data that include real-estate activities and the corresponding known days to pending amounts provide a set of known H values (e.g., the days to pending amounts) having corresponding X values (e.g., feature vectors extracted from the real-estate property activities). Using these data, the model parameter β can be computed using data fitting techniques such as least squares, maximum likelihood or the like. Once β is estimated, the model can then compute H (e.g., days to pending amount) for a new set of X values (e.g., feature vectors extracted from a new set of real-estate property activities).

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some embodiments, the machine learning technique training module 220 is trained to establish a relationship to predict the number of days to pending for a given property based on a logistic regression of one or more features (e.g., training data received from real-estate activities training data module 210). For example, machine learning technique training module 220 models the log-odds of clearance rate (e.g., the length of time it takes for a property to sell after being listed) in a given week t as a linear model computed in accordance with:

$$\log\left(\frac{p_t(x)}{1 - p_t(x)}\right) = \beta_0 + \beta_1 x_1 + \ldots B_n x_n$$

Where $B_0$ is an intercept, $B_1$ and $B_n$ are coefficients that are adjusted using linear regression for each feature $x_1$, $x_2$, $x_n$ etc. Where $x_1$, $x_2$, $x_n$ etc. correspond to one or more respective real-estate property activities or information n provided by real-estate activities training data module 210 and $p_t(x)$ corresponds to the days to pending for properties corresponding to features $x_1$, $x_2$, etc.

Converting from log-odds to clearance $p_t(x)$ may be performed by applying the inverse log-odds transform in accordance with:

$$p_t(x) = (e^{B0+B1x1+B2x2+B3x3+ \ldots BnXn})/(1 + (e^{B0+B1x1+B2x2+B3x3 \ldots BnXn})),$$

where B0 represents an intercept, B1 represents a first coefficient, B2 represents a second coefficient, B3 represents a third coefficient, x1 is the first activity or listing information, x2 is the second activity or listing information, x3 is the third activity or listing information, Bn represents an $n^{th}$ coefficient, $X_n$ is the $n^{th}$ activity or listing information, where n corresponds to a total number of activities in the different types of activities or listing information.

Machine learning technique training module 220 may compute the coefficients by adjusting coefficient values in a way that results in maximizing the $\log(pt(x)/(1-pt(x))$. In some embodiments, $B_0$ may correspond to an intercept of the model trained that is based on publicly available information stored in third-party servers 130 and a remaining set of coefficients $B_1$, $B_2$, $B_n$ etc. may be correspond to data exclusively available to server system 108 and specifically to listing projection model system 124. Such data may include the number of agent visits per day and number of offers per visit that is not publicly available outside of server system 108.

In some embodiments, the listing projection model system 124 may train the machine learning technique training module 220 (e.g., adjust the coefficients of the function) on a periodic basis (e.g., weekly, monthly, daily, for each season). In some other embodiments, the listing projection model system 124 may train the machine learning technique training module 220 (e.g., adjust the coefficients of the function) in real time as new property activities are detected (e.g., each time a value for a given property is updated in database 128. For example, in response to detecting that a real-estate property listing in the MLS server has changed to pending status, the machine learning technique training module 220 may obtain one or more real-estate property activities associated with that property and retrain itself to recompute the coefficients based on the information about the property that has changed to pending status.

After being trained, the machine learning technique is provided to trained machine learning technique module 230. In one example, the coefficient values of the linear model are stored in a storage of trained machine learning technique module 230. Trained machine learning technique module 230 is configured to receive new real-estate property activity information from new real-estate property data module 240. For example, new real-estate property data module 240 receives a user input that identifies a particular property or listing identifier associated with a property. New real-estate property data module 240 accesses database 128 and/or server 130 to obtain one or more real-estate property activities associated with the property. For example, new real-estate property data module 240 obtains the property address, one or more attributes of the property, number of agent visits per day, date of when the property was listed and/or any other activity associated with the property. New real-estate property data module 240 instructs the trained machine learning technique module 230 to apply the trained machine learning technique using the previously computed coefficients to the data provided by new real-estate property data module 240. Trained machine learning technique module 230 provides a predicted days to pending amount based on the data provided by new real-estate property data module 240.

In one example, after being trained the machine learning technique training module 220 predicts the number of days to pending for a given property that is newly listed as a function of the number of visits during the first week to the property and the number of weeks on the market. In some embodiments, machine learning technique training module 220 may consider the visit duration in generating the prediction. The probability of an offer increases as the visit duration increases. For example, visits that last longer than 14 minutes result in increase in offers and thereby reduce the days to pending generated by trained machine learning technique module 230. Visits that last more than 14 minutes are 3.5 times as likely to result in a contract than visits lasting less than 14 minutes. Accordingly, if new real-estate property data module 240 obtains as data for a new property that the duration of the visit is 14 minutes, this data along with the amount of time that has elapsed since the property was listed is provided to the trained machine learning technique module 230 which then provides a prediction that the days to pending is 30 days which may be much less time than another property in which visits lasted less than 14 minutes.

In some embodiments, machine learning technique training module 220 may consider the number of agent visits per day and the number of offers per visit in generating the prediction of the days to pending for a new property. The probability that the property will stay on the market without a contract for purchase longer may increase as the number of agent visits per day decreases and the number of offers per visit decreases.

In some embodiments, any one or combination of the training data received from real-estate activities training data module 210 may be itself predicted based on a separate model for a new real-estate property. For example, before listing a new real-estate property, listing projection model system 124 may predict the number of agent visits per day and the number of offers per visit expected for a given property. These predictions may be provided to machine learning technique training module 220 to be trained. In other embodiments, the machine learning technique training module 220 may be trained for a new real-estate property after one week of listing the new real-estate property.

In some embodiments, any one or combination of the real-estate activities training data module 210 may be normalized based on a statistical distribution. For example, each activity may be de-seasonalized and standardized by transforming to percentile within a calendar week and week on market (e.g., all listings on January 1 that are in week 1 on market). Time leakage is removed by shifting forward by one calendar week. One way to normalize a given activity may be based on a mean of the activity across a number of weeks.

In some embodiments, new real-estate property data module 240 instructs the trained machine learning technique module 230 to recompute the days to pending prediction amount in response to one or more events (e.g., a predetermined time interval or when a new real-estate property activity is detected). For example, new real-estate property data module 240 instructs the trained machine learning technique module 230 to recompute the days to pending prediction amount in response to determining that the particular property has been listed for over a week. Specifically, new real-estate property data module 240 instructs the trained machine learning technique module 230 to recompute the days to pending amount once per week, once per day, once per month or after any predetermined interval.

As another example, new real-estate property data module 240 instructs the trained machine learning technique module 230 in response to detecting that an additional listing for another real-estate property with similar attributes and within a predetermined distance of the new real-estate property is listed after the new real-estate property was listed. For example, new real-estate property data module 240 may initially obtain an initial prediction for a first real-estate property after the property was listed for one week. After that first week, new real-estate property data module 240 detects that a second real-estate property with similar attributes and within a predetermined distance (e.g., 1.5 miles) of the first real-estate property was newly listed for sale. In response to this detection, new real-estate property data module 240 instructs the trained machine learning technique module 230 to generate a current days to pending prediction for the first real-estate property. The new predicted days to pending may be longer than the initial days to pending amount because having an additional property for buyers to consider may delay any offer a buyer is willing to make for the first property.

In some implementations, trained machine learning technique module 230 provides the initial and the current days to pending prediction to days to pending prediction module 250. Days to pending prediction module 250 may compute a difference between the initial and the current days to pending predictions and compare the difference to a threshold. For example, days to pending prediction module 250 may determine whether the days to pending prediction has increased since initially computed by more than a certain amount (e.g., by more than 30 days). In response to determining that the difference exceeds the threshold, the days to pending prediction module 250 flags the first real-estate property for review or adjusts an asking price associated with the first real-estate property by a predetermined percentage. For example, an indication may be provided to a user (e.g., a broker of the first real-estate property) indicating that the days to pending prediction has increased since the property was listed. The user may then perform an action such as uploading more information to a listing for the property or adjust a price of the property.

Days to pending prediction module 250 stores, outputs (e.g., by way of a preview or user interface on an app or a website), sends an SMS, sends an MMS, or emails the initial or current predicted amount of days to pending for the property identified by new real-estate property data module 240 to a user at client device 110.

Figure 3:
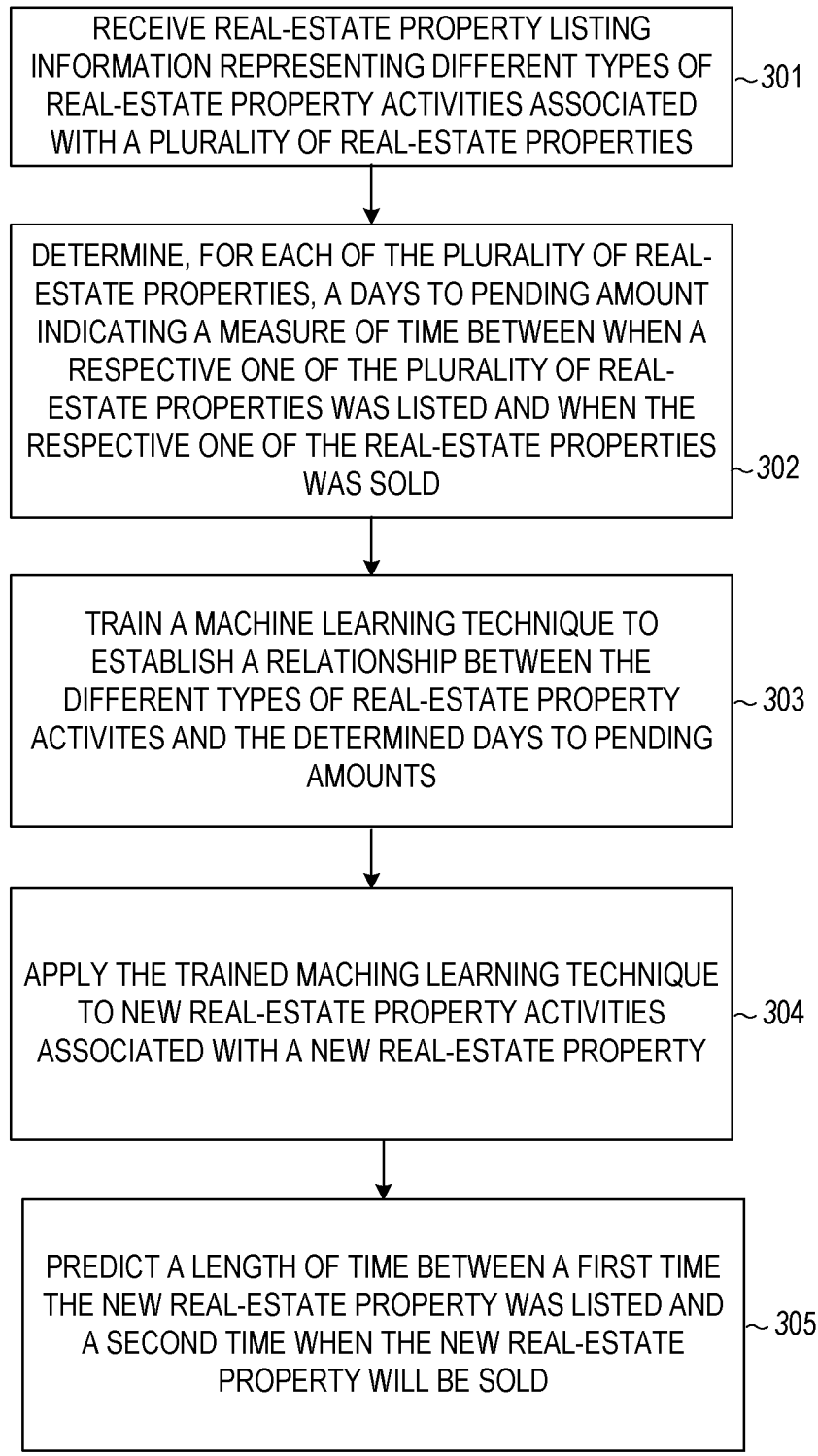
FIGS. 3-5 illustrate flow diagrams of processes for automatically creating real-estate property transaction documents, according to some example embodiments.
Figure 4:
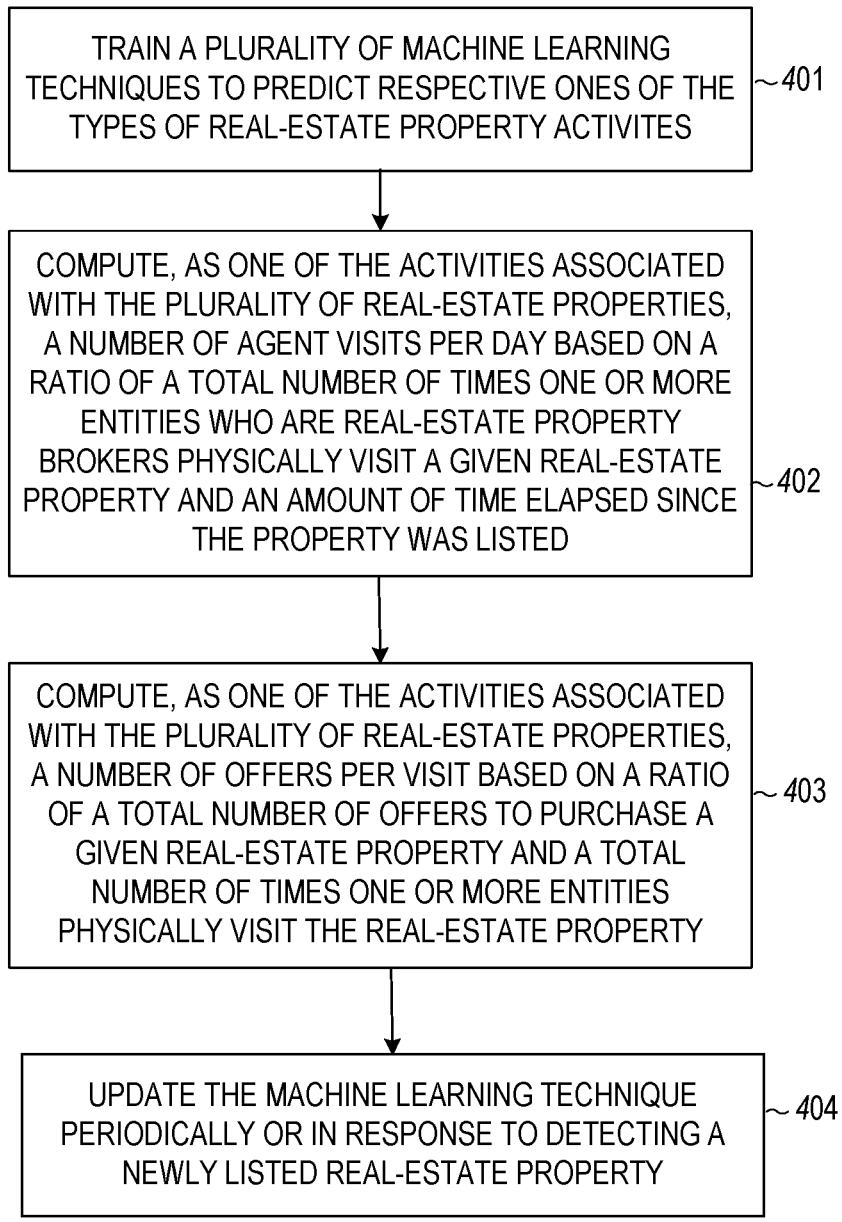
Figure 5:
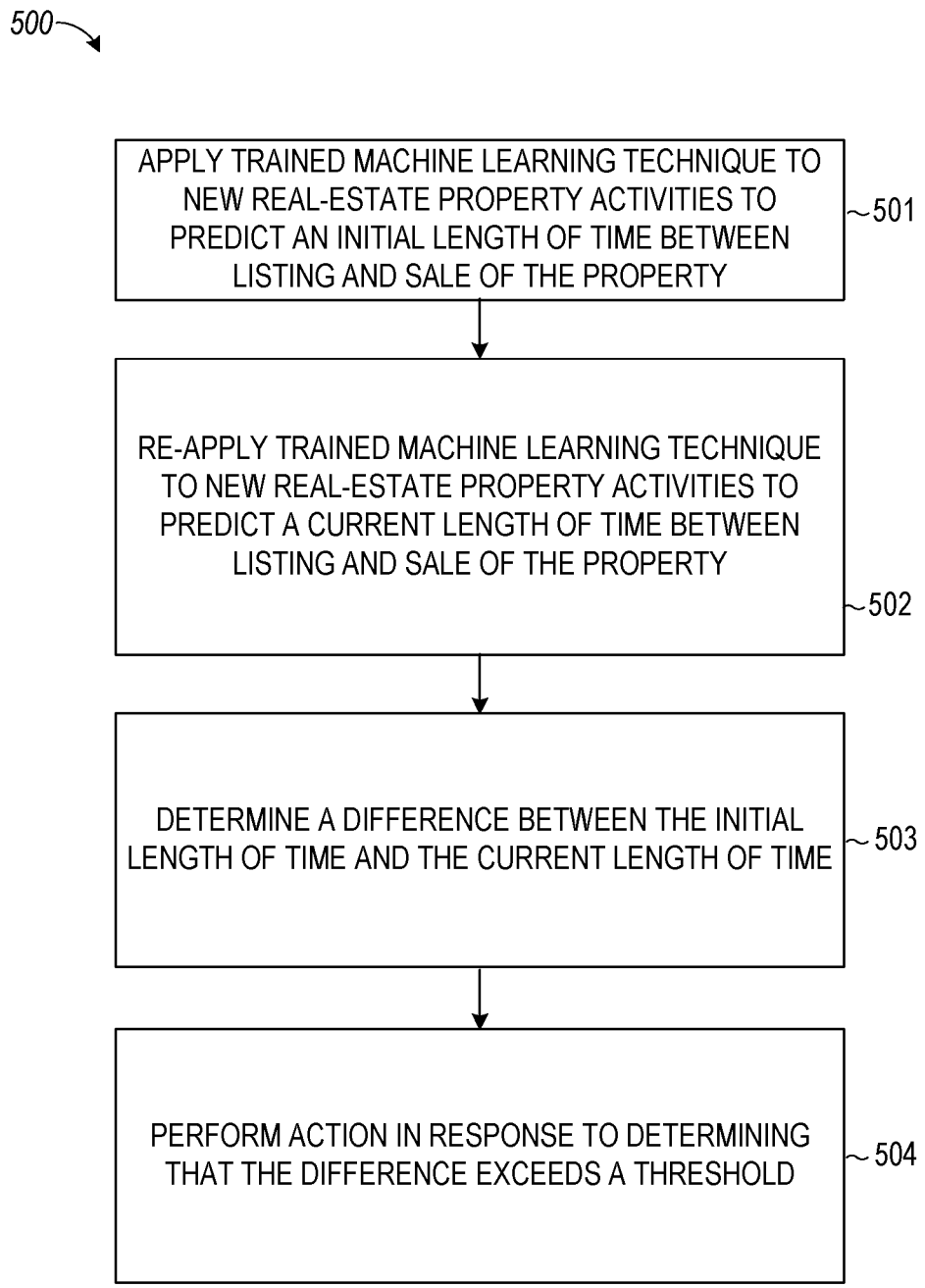

FIGS. 3-5 illustrate flow diagrams of processes 300-500 for automatically projecting or predicting days to pending amount for a real-estate property, according to some example embodiments. The processes 300-500 may be embodied in computer-readable instructions for execution by one or more processors such that the operations of the processes 300-500 may be performed in part or in whole by the functional components of the server system 108; accordingly, the processes 300-500 are described below by way of example with reference thereto. However, in other embodiments at least some of the operations of the processes 300-500 may be deployed on various other hardware configurations. The processes 300-500 are therefore not intended to be limited to the server system 108 and can be implemented in whole, or in part, by any other component.

At operation 301, a computing system (e.g., server system 108) receives real-estate property listing information representing different types of real-estate property activities associated with a plurality of real-estate properties. For example, real-estate activities training data module 210 obtains from database 128 and/or server 130 real-estate activities of various types associated with various properties (e.g., number of agent visits per day, days to pending amounts for each property that has already sold, number of views per day, visit duration, etc.). In some implementations, the real-estate property activities are predicted using respective machine learning techniques associated with each activity. Such implementations are discussed below in connection with FIG. 4.

At operation 302, the computing system determines, for each of the plurality of real-estate properties, a days to pending amount indicating a measure of time between when a respective one of the plurality of real-estate properties was listed and when the respective one of the real-estate properties was sold. For example, real-estate activities training data module 210 accesses an MLS server for each property associated with the real-estate activities to obtain the date the given property was listed for sale and the date the property entered into contract or closed on the sale. Real-estate activities training data module 210 computes a difference between the date the property was listed and the date the property entered into contract or closed on the sale to determine the days to pending amount for each property associated with the received activities.

At operation 303, the computing system trains a machine learning technique to establish a relationship between the different types of real-estate property activities and the determined days to pending amounts. For example, real-estate activities training data module 210 provides the known days to pending amount and the known one or more activities associated with each property to machine learning technique training module 220. Machine learning technique training module 220 inputs the received data into a linear model (e.g., a log odds model) to estimate or compute coefficients associated with each activity. In some implementations, machine learning technique training module 220 performs a regression technique to estimate the coefficients of the model.

At operation 304, the computing system applies the trained machine learning technique to new real-estate property activities associated with a new real-estate property. For example, after a new real-estate property is listed, new real-estate property data module 240 continuously or periodically computes or determines a set of real-estate property activities associated with the new real-estate property. In one example, new real-estate property data module 240 communicates with a mobile computing station at the location of the new real-estate property to determine who visits the property (e.g., an agent or a non-agent), when they visit the property, and for how long they stay at the property. This information can be determined by different people logging into the mobile computing station that logs the time the person arrived and the time the person left the premises. Based on the information received from the mobile computing station, new real-estate property data module 240 can determine the number of agent/non-agent visits and the duration in a given week (e.g., in the first week the property is listed) and in subsequent weeks. New real-estate property data module 240 can then determine or compute the ratio of the total number of visitors to the total number of weeks the property was listed as one or more of the activities associated with the new real-estate property.

As another example, new real-estate property data module 240 can communicate with an MLS server to obtain one or more attributes of the real-estate property (e.g., location, type, whether it is on a busy road, when the property was listed, whether the property has a pool, and so forth) and can provide this information as one of the activities. As another example, new real-estate property data module 240 can monitor the webpage that includes the listing for the new real-estate property to determine how many views the webpage receives and whether or not people dislike the listing. New real-estate property data module 240 can then compute as one of the activities the number of views to the webpage and the number of dislikes per view. Any combination of the information determined by new real-estate property data module 240 can be provided to the trained machine learning technique module 230. Also, the new real-estate property data module 240 can determine an initial value for any combination of these activities (e.g., within one week of when the property was listed) and a current value (e.g., within subsequent weeks of the first week from when the property was first listed). The current value can be computed every week or in response to detecting a newly listed property after the new real-estate property was listed that is within a predetermine distance (e.g., within 1.5 miles) and that is of a similar type (e.g., same size and having one or more shared attributes) as the new real-estate property.

At operation 305, the computing system predicts a length of time between a first time the new real-estate property was listed and a second time when the new real-estate property will be sold. For example, after receiving the new real-estate property activities, the trained machine learning technique module 230 receives one or more new activities associated with a newly listed real-estate property from new real-estate property data module 240. The trained machine learning technique module 230 applies the previously computed coefficients to the data received from new real-estate property data module 240 to predict a days to pending amount for the newly listed real-estate property. For example, after being listed for one week, the number of agents visits per day is provided to the trained machine learning technique module 230 along with other information about the property (e.g., the listing date) and, based on this information, the trained machine learning technique module 230 predicts a days to pending amount for the newly listed property. The days to pending amount can be predicted on an ongoing basis or as new real-estate property data module 240 obtains new information about the new real-estate property listing.

Process 400 (FIG. 4) illustrates an exemplary set of operations for training multiple machine learning techniques to predict the real-estate property activities and for updating the machine learning technique that predicts a days to pending amount for a new real-estate property.

At operation 401, the computing system trains a plurality of machine learning techniques to predict respective ones of the types of real-estate property activities. For example, real-estate activities training data module implements one or more machine learning techniques (similar to machine learning technique training module 220) that predict respective ones of the real-estate property activities. For example, new real-estate property data module 240 provides to trained machine learning technique module 230 a number of agent visits per day that is computed and determined by server 108 from observing who physically visits a currently listed property. Real-estate activities training data module 210 may apply a machine learning technique to predict the number of views per day and the visit duration associated with the currently listed property. Real-estate activities training data module 210 provides these predicted values to trained machine learning technique module 230. Trained machine learning technique module 230 can then predict a days to pending amount for the currently listed property based on the actual information observed for the property as provided by new real-estate property data module 240 and also based on the predicted real-estate activities provided by real-estate activities training data module 210.

At operation 402, the computing system computes, as one of the activities associated with the plurality of real-estate properties, a number of agent visits per day based on a ratio of a total number of times one or more entities who are real-estate property brokers physically visit a given real-estate property and an amount of time elapsed since the property was listed. For example, as discussed above, the server system 108 communicates with a mobile computing device in a particular physical property to determine who visits the property on a given day and when the person or persons visit the property. Based on this information and listing specific information including a date when the property was listed as provided by the MLS server, server system 108 computes the number of agent visits per day.

At operation 403, the computing system computes, as one of the activities associated with the plurality of real-estate properties, a number of offers per visit based on a ratio of a total number of offers to purchase a given real-estate property and a total number of times one or more entities physically visit the real-estate property. For example, as discussed above, the server system 108 communicates the MLS server to determine how many offers are placed on a property for a given listing of the property. Based on this information and the information provided by a computing device at the property location indicating who visits the property and when they visit, server system 108 computes the number of offers per visit.

At operation 404, the computing system updates the machine learning technique periodically or in response to detecting a newly listed real-estate property.

Process 500 (FIG. 5) illustrates an exemplary set of operations for performing an action based on monitoring real-estate property activities of a real-estate property that has been listed and that has not entered pending status. For example, after the property is listed, the computing system continues monitoring real-estate property activities associated with the property to determine whether the activities change the predicted days to pending amount. For example, the computing system communicates with a mobile computing device at the location of a new property that has been listed to determine how many people physically visit the property in a given week. As another example, the computing system communicates with a website that hosts a webpage that includes the listing for the new property to determine how many views and/or dislikes the given listing receives. This can be performed on a weekly or periodic basis.

At operation 501, the computing system applies the trained machine learning technique to new real-estate property activities (e.g., the number of agent/non-agent visits in a first week, the duration of each visit, the number of views a webpage with a listing for the property receives, and so forth) for the newly listed property to predict an initial length of time between listing and sale of the property. For example, the new real-estate property data module 240, after one week from when a first real-estate property is listed, provides one or more real-estate property activities that were observed to the trained machine learning technique module 230. For example, as new real-estate property data module 240 determines that a given real-estate activity changes in real-time or on a weekly or periodic basis, new real-estate property data module 240 computes any one or combination of the activities discussed above and below for the new properties. As an example, after the new property was listed for one week, new real-estate property data module 240 communicates with a mobile computing device at the property to obtain the number and types of visitors that physically visited the property and/or the duration of each visit (this may be tracked by having people log into the mobile computing device when they arrive and log out of the mobile computing device when they leave).

Based on this received information, trained machine learning technique module 230 predicts an initial days to pending amount for the first property. For example, the one or more combination of activities are provided as separate features to the machine learning technique to generate an initial prediction for the activities. In some implementations, the activities are averaged with corresponding ones of previously determined activities for the property before being provided as a feature to the machine learning technique. In some implementations, one or more of the activities are standardized (e.g., based on a season or time of year) before being applied as a feature to the machine learning technique.

At operation 502, the computing system re-applies the trained machine learning technique to new real-estate property activities to predict a current length of time between listing and sale of the property. For example, the new real-estate property data module 240, after one month from when a first real-estate property is listed, provides additional one or more real-estate property activities that were observed to the trained machine learning technique module 230. Based on this received information, trained machine learning technique module 230 predicts a current days to pending amount for the first property.

At operation 503, the computing system determines a difference between the initial length of time and the current length of time. For example, the computing system takes a difference between the initial length of time (e.g., 30 days) and the current length of time (e.g., 50 days) by subtracting 50 days from 30 days to determine the current length of time is 20 more days than the initial length of time.

At operation 504, the computing system performs an action in response to determining that the difference exceeds a threshold. For example, days to pending prediction module 250 determines whether the initial days to pending amount has increased by more than a threshold amount (e.g., 15 days) based on the current days to pending amount. The threshold amount may be user specified or a fixed amount that is specific to a particular location. The computing system retrieves the threshold amount that corresponds to the location of the given new real-estate property to compare to the difference. In response to determining that the amount increased by more than the threshold, days to pending prediction module 250 flags the listing for a user to review and/or automatically adjusts (e.g., reduces) a sale price in a listing associated with the real-estate property by a predetermined percentage. As another example, in response to determining that the amount increased by more than the threshold, days to pending prediction module 250 modifies the listing for the new real-estate property by adding or subtracting pictures of the property and/or emphasizing or de-emphasizing pictures of the property. As another example, in response to determining that the amount increased by more than the threshold, days to pending prediction module 250 communicates with an advertising server to cause the property to be advertised in one or more platforms. As another example, in response to determining that the amount increased by more than the threshold, days to pending prediction module 250 communicates with one or more buyers who previously submitted an offer to purchase the property to accept their previously submitted offer. For example, a buyer submits an offer to purchase the property for a lower price than the listed price. This offer can remain pending until the seller accepts for a period of time. If the days to pending amount increased by more than the threshold, the previously submitted offer can be automatically accepted to avoid losing the potential buyer or a message can be sent to that buyer to ask if the offer is still available. As another example, in response to determining that the amount increased by more than the threshold, days to pending prediction module 250, the property can be de-listed and no longer offered for sale to allow more time to pass and potentially list the property in the future if the days to pending amount reaches a specified lower value at the future time.

As an example, the machine learning technique analyzes a collection of previous property sales (e.g., 100 property sales or more) in a given area (e.g., a 1.5 square mile radius). As part of this analysis, the machine learning technique receives features of activities of these properties indicating the days to pending for each property and the number of entities that visited the properties on the first week and the number of entities that visited the properties in weeks following the first week leading up to the date the property became pending (e.g., entered into contract for sale). The machine learning technique, for example, determines that the days to pending amounts was 30 days for properties in which the number of entities that visited the property in the first week versus the number of entities that visited the property in subsequent weeks has been reduced by 40% on a weekly basis. Also, the machine learning technique, for example, determines that the days to pending amounts was 60 days for properties in which the number of entities that visited the property in the first week versus the number of entities that visited the property in subsequent weeks has been reduced by 60% on a weekly basis. Accordingly, the machine learning technique is trained to establish this relationship (e.g., by computing the coefficients of a model) between number of entities that visit a property on a weekly basis and the days to pending amounts for the particular area. When a new property is listed in the given area, the machine learning technique, after a couple of weeks from when the property is listed, analyzes the number of entities that visit the newly listed property using the model, the machine learning technique predicts the days to pending amount for the property. For example, if the number of entities that visit the newly listed property is reduced by 40%, the model predicts that the days to pending amount for the property will be 30 days. The machine learning technique also continues monitoring the activities for the newly listed property and may determine that the number entities that visited dropped all of a sudden by 60%. In such cases, the machine learning technique determines that the days to pending amount increases to 60 days and performs an action (e.g., drops the price of the property).

Figure 6:
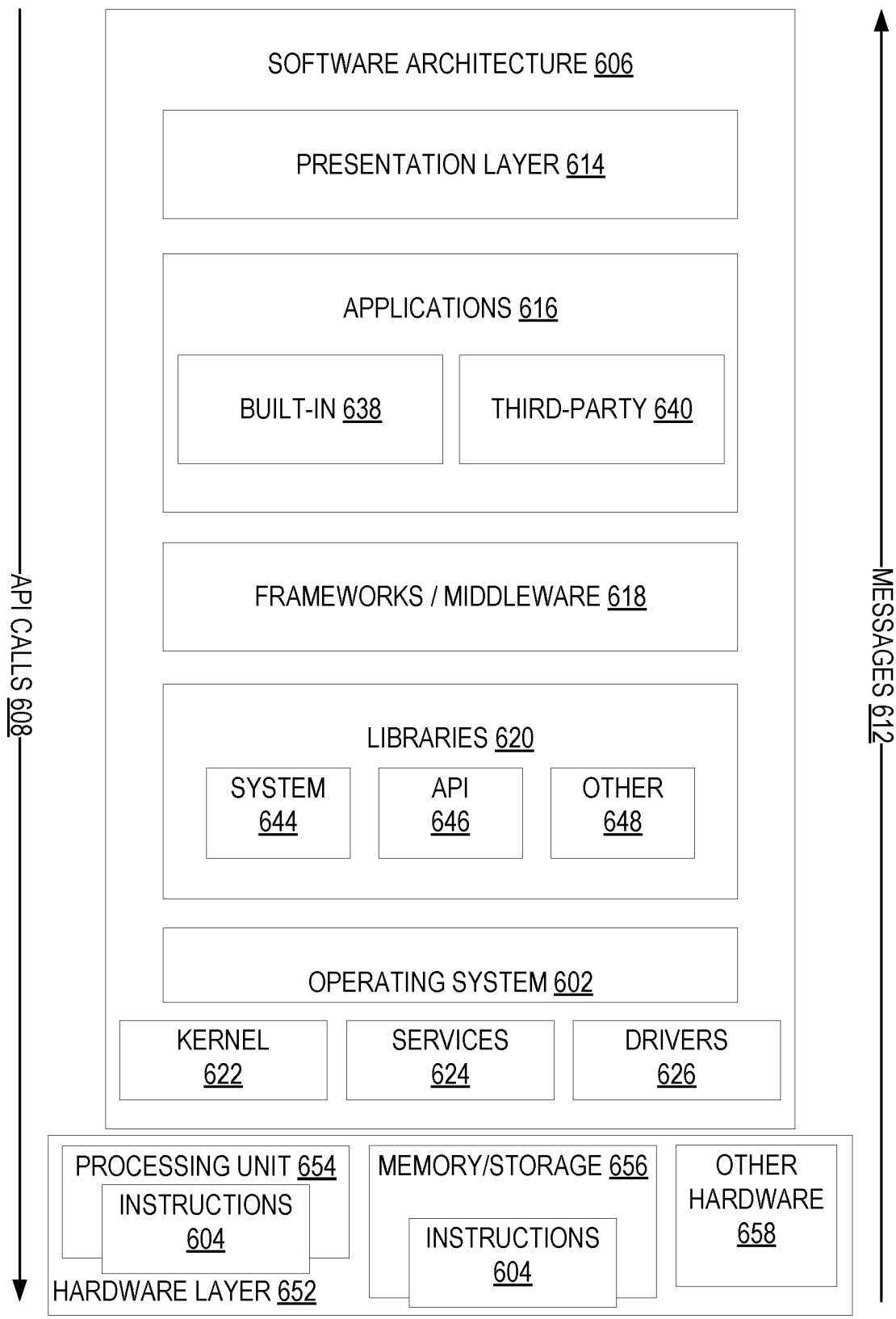
FIG. 6 is a block diagram illustrating an example of a software architecture that may be installed on a machine, according to some example embodiments.

FIG. 6 is a block diagram illustrating software architecture 606, which can be installed on any one or more of the devices described above. For example, in various embodiments, client devices 110 and servers and systems 130, 108, 120, 122, and 124 may be implemented using some or all of the elements of software architecture 606. FIG. 6 is merely a non-limiting example of a software architecture, and it will be appreciated that many other architectures can be implemented to facilitate the functionality described herein. In various embodiments, the software architecture 606 is implemented by hardware such as machine 700 of FIG. 7 that includes processors 704, memory/storage 706, and I/O components 718. In this example, the software architecture 606 can be conceptualized as a stack of layers where each layer may provide a particular functionality. For example, the software architecture 606 includes layers such as an operating system 602, libraries 620, frameworks 618, and applications 616. Operationally, the applications 616 invoke application programming interface (API) calls 608 through the software stack and receive messages 612 in response to the API calls 608, consistent with some embodiments.

In various implementations, the operating system 602 manages hardware resources and provides common services. The operating system 602 includes, for example, a kernel 622, services 624, and drivers 626. The kernel 622 acts as an abstraction layer between the hardware and the other software layers, consistent with some embodiments. For example, the kernel 622 provides memory management, processor management (e.g., scheduling), component management, networking, and security settings, among other functionality. The services 624 can provide other common services for the other software layers. The drivers 626 are responsible for controlling or interfacing with the underlying hardware, according to some embodiments. For instance, the drivers 626 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 620 provide a low-level common infrastructure utilized by the applications 616. The libraries 620 can include system libraries 644 (e.g., C standard library) that can provide functions such as memory allocation functions, string manipulation functions, mathematic functions, and the like. In addition, the libraries 620 can include API libraries 646 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 620 can also include a wide variety of other libraries 648 to provide many other APIs to the applications 616.

The frameworks 618 provide a high-level common infrastructure that can be utilized by the applications 616, according to some embodiments. For example, the frameworks 618 provide various graphic user interface (GUI) functions, high-level resource management, high-level location services, and so forth. The frameworks 618 can provide a broad spectrum of other APIs that can be utilized by the applications 616, some of which may be specific to a particular operating system 602 or platform.

In an example embodiment, the applications 616 include a home application, a contacts application, a browser application, a book reader application, a location application, a media application, a messaging application, a game application, and a broad assortment of other applications such as a third-party application 640. According to some embodiments, the applications 616 are programs that execute functions defined in the programs. Various programming languages can be employed to create one or more of the applications 616, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 608 provided by the operating system 602 to facilitate functionality described herein.

Some embodiments may particularly include a real estate application. In certain embodiments, this may be a stand-alone application that operates to manage communications with a server system such as third-party servers 130 or server system 108. In other embodiments, this functionality may be integrated with another application. The real estate application may request and display various data related to real estate and may provide the capability for a user to input data related to the objects via a touch interface, keyboard, or using a camera device of machine 700, communication with a server system via I/O components 718, and receipt and storage of object data in memory/storage 706. Presentation of information and user inputs associated with the information may be managed by real estate application using different frameworks 618, library 620 elements, or operating system 602 elements operating on a machine 700.

Figure 7:
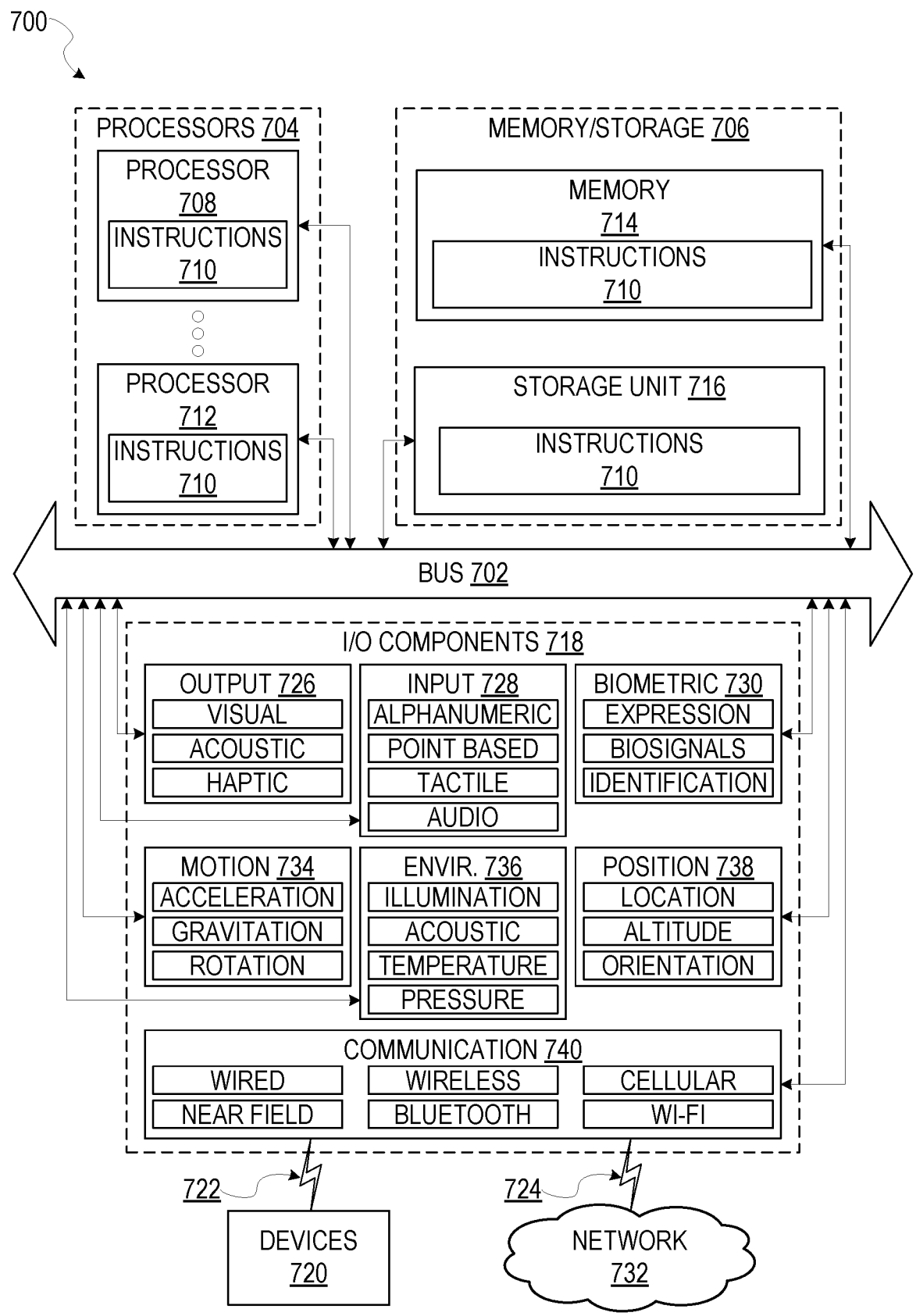
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application 616, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 130, 108, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines 700 that individually or jointly execute the instructions 710 to perform any one or more of the methodologies discussed herein.

In various embodiments, the machine 700 comprises processors 704, memory 714, and I/O components 718, which can be configured to communicate with each other via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 708 and a processor 712 that may execute the instructions 710. The term "processor" is intended to include multi-core processors 704 that may comprise two or more independent processors 704 (also referred to as "cores") that can execute instructions 710 contemporaneously. Although FIG. 7 shows multiple processors 704, the machine 700 may include a single processor 704 with a single core, a single processor 704 with multiple cores (e.g., a multi-core processor 704), multiple processors 704 with a single core, multiple processors 704 with multiples cores, or any combination thereof.

The memory/storage 706 comprises a main memory 714, a static memory, and a storage unit 716 accessible to the processors 704 via the bus 702, according to some embodiments. The storage unit 716 can include a machine-readable medium on which are stored the instructions 710 embodying any one or more of the methodologies or functions described herein. The instructions 710 can also reside, completely or at least partially, within the main memory 714, within the static memory, within at least one of the processors 704 (e.g., within the processor's cache memory), or any suitable combination thereof, during execution thereof by the machine 700. Accordingly, in various embodiments, the main memory 714, the static memory, and the processors 704 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 710. The term "machine-readable medium" shall also be taken to include any medium, or combination of multiple media, that is capable of storing instructions (e.g., instructions 710) for execution by a machine (e.g., machine 700), such that the instructions 710, when executed by one or more processors of the machine 700 (e.g., processors 704), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 718 include a wide variety of components to receive input, provide output, produce output, transmit information, exchange information, capture measurements, and so on. In general, it will be appreciated that the I/O components 718 can include many other components that are not shown in FIG. 7. The I/O components 718 are grouped according to functionality merely for simplifying the following discussion, and the grouping is in no way limiting. In various example embodiments, the I/O components 718 include output components 726 and input components 728. The output components 726 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 728 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 718 include biometric components 730, motion components 734, environmental components 736, or position components 738, among a wide array of other components. For example, the biometric components 730 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 738 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 718 may include communication components 740 operable to couple the machine 700 to a network 732 or devices 720 via a coupling 724 and a coupling 722, respectively. For example, the communication components 740 include a network interface component or another suitable device to interface with the network 732. In further examples, communication components 740 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 720 may be another machine 700 or any of a wide variety of peripheral devices (e.g., a peripheral device coupled via a Universal Serial Bus (USB)).

Moreover, in some embodiments, the communication components 740 detect identifiers or include components operable to detect identifiers. For example, the communication components 740 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 740, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 732 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 732 or a portion of the network 732 may include a wireless or cellular network, and the coupling 724 may be a Code Division Multiple Access (CDMA) connection, a Global System for Mobile communications (GSM) connection, or another type of cellular or wireless coupling. In this example, the coupling 722 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 710 are transmitted or received over the network 732 using a transmission medium via a network interface device (e.g., a network interface component included in the communication components 740) and utilizing any one of a number of well-known transfer protocols (e.g., Hypertext Transfer Protocol (HTTP)). Similarly, in other example embodiments, the instructions 710 are transmitted or received using a transmission medium via the coupling 722 (e.g., a peer-to-peer coupling) to the devices 720. The term "transmission medium" shall be taken to include any intangible medium that is capable of storing, encoding, or carrying the instructions 710 for execution by the machine 700, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
receiving, by a server, real-estate property listing information representing different types of in-person real-estate property activities associated with a plurality of previously sold real-estate properties;
determining, for each of the plurality of previously sold real-estate properties, a known days to pending amount indicating a measure of time between when a respective one of the plurality of real-estate properties was listed and when the respective one of the plurality of real-estate properties was sold;
training a machine learning technique to establish a relationship between the different types of in-person real-estate property activities and days to pending amounts by processing training data comprising the in-person real-estate property activities and the days to pending amounts corresponding to each of the plurality of previously sold real-estate properties, the training being performed by:
retrieving a portion of the training data from a storage device, the portion of the training data comprising the in-person real-estate property activities of a given previously sold real-estate property of the plurality previously sold real-estate properties and a known days to pending amount of the given previously sold real-estate property;
extracting in-person real-estate property activities features from the training data for the given previously sold real-estate property;
utilizing the machine learning technique to estimate a days to pending amount for the given previously sold real-estate property based on the extracted in-person real-estate property activities features;
updating parameters of the machine learning technique to map the estimated days to pending amount for the given previously sold real-estate property to the known days to pending amount for the given previously sold real-estate property; and
providing, as a result of updating the parameters of the machine learning technique, a trained machine learning technique;
receiving, by the server, initial real-estate property listing information representing different types of in-person real-estate property activities associated with a new real-estate property;
applying the trained machine learning technique to the initial real-estate listing information to determine an initial days to pending amount for the new real-estate property;
receiving updated real-estate property listing information representing the different types of in-person real-estate property activities associated with the new real-estate property;
applying the trained machine learning technique to the updated real-estate listing information to determine a current days to pending amount for the new real-estate property;
determining a difference between the initial days to pending amount and the current days to pending amount and
performing an action based on whether the difference between the initial days to pending amount and the current days to pending amount exceeds a days to pending threshold.

2. The computer implemented method of claim 1, wherein the server is a first server, and wherein a first portion of the real-estate property listing information is received from a third-party server and a second portion of the real-estate property listing information is determined by the first server.

3. The computer implemented method of claim 2, wherein the in-person activities in the second portion of the real-estate property listing information include at least one of a number of agent visits per day, a number of offers per visit, a number of non-agent visits per day, or a visit duration.

4. The computer implemented method of claim 1 further comprising:
obtaining, as a first activity of the in-person activities corresponding to each of the plurality of previously sold real-estate properties; a number of agent visits per day, a number of offers per visit, a number of non-agent visits per day, or a visit duration; and
computing, as a second activity of the in-person activities corresponding to each of the plurality of previously sold real-estate properties, a number of agent visits per day based on a ratio of a total number of times one or more entities who are real-estate property brokers physically visit the real-estate property and an amount of time elapsed since the real-estate property was listed.

5. The computer implemented method of claim 4 further comprising computing, as a third activity of the in-person activities corresponding to each of the plurality of previously sold real-estate properties, a number of offers per visit for each of the plurality of previously sold real-estate properties based on a ratio of a total number of offers to purchase the real-estate property and a total number of times one or more entities physically visit the real-estate property.

6. The computer implemented method of claim 5, wherein the training data used to train the machine learning technique includes the first, second, and third in-person activities and a first portion of the real-estate property listing information is received from a third-party server, and wherein the machine learning technique includes a log-odds model trained in accordance with: $p_r(x) = (e^{B0+B1x1+B2x2+B3x3+\ldots BnXn})/(1+e^{B0+B1x1+B2x2+B3x3\ldots BnXn})$, where B0 represents an intercept, B1 represents a first coefficient, B2 represents a second coefficient, B3 represents a third coefficient, x1 is the first activity or listing information, x2 is the second activity or listing information, x3 is the third activity or listing information, Bn represents an $n^{th}$ coefficient, $X_n$ is the $n^{th}$ activity or listing information, where n corresponds to a total number of in-person activities in the different types of activities or listing information.

7. The computer implemented method of claim 6, wherein the machine learning technique is a linear model that is updated periodically.

8. The computer implemented method of claim 7, wherein the step of training the machine learning technique further comprises performing logistic regression of information associated with the plurality of previously sold real-estate properties corresponding to the first, second, and third in-person activities in the linear model to estimate values for the first, second and third coefficients.

9. The computer implemented method of claim 1, wherein the updated real-estate property listing information is received periodically or in response to detecting that another real-estate property has been listed after a first time representing when the new real-estate property was listed, and wherein the trained machine learning technique is applied to the updated real-estate property listing information periodically or in response to detecting that another real-estate property has been listed after the first time.

10. The computer implemented method of claim 1 further comprising:
computing, based on the initial real-estate property listing information, an initial number of agent visits per day within a first week of when the new real-estate property was listed; and
computing, based on the updated real-estate property listing information, an updated number of agent visits per day within one or more weeks following the first week of when the new real-estate property was listed, wherein when the updated number of agent visits per day is less than the initial number of agent visits per day by more than an agent visits per day threshold, the action is performed.

11. The computer implemented method of claim 1, wherein performing the action comprises flagging the new real-estate property for review.

12. The computer implemented method of claim 1, wherein performing the action comprises automatically adjusting an asking price for the new real-estate property.

13. The computer implemented method of claim 1 further comprising:
determining, based on the initial real-estate property listing information, a number of times one or more entities visited the new real-estate property within one week of when the new real-estate property was first listed; and
computing, based on the updated real-estate property listing information, a number of weeks that have elapsed since the new real-estate property was first listed, wherein the trained machine learning technique is applied based on the number of times and the number of weeks.

14. The computer implemented method of claim 1, wherein the machine learning technique is a first machine learning technique, further comprising training a plurality of machine learning techniques to predict respective ones of the types of real-estate property activities, wherein the first machine learning technique is trained based on outputs of the plurality of machine learning techniques.

15. The computer implemented method of claim 1 further comprising standardizing at least one of the types of real-estate property activities based on a time of year.

16. The computer implemented method of claim 1, wherein at least a portion of the initial and updated in-person real-estate property activities associated with the new real-estate property is derived from information obtained by a mobile computer operatively connected to the server; and wherein the mobile computer is physically located in the new real estate property.

17. The computer implemented method of claim 1, wherein performing the action comprises communicating with one or more buyers who previously submitted an offer to purchase the new real-estate property to accept their previously submitted offer.

18. A system comprising:
a memory that stores instructions; and
one or more processors on a server configured by the instructions to perform operations comprising:
receiving real-estate property listing information representing different types of in-person real-estate property activities associated with a plurality of previously sold real-estate properties;
determining, for each of the plurality of previously sold real-estate properties, a known days to pending amount indicating a measure of time between when a respective one of the plurality of real-estate properties was listed and when the respective one of the plurality of real-estate properties was sold;
training a machine learning technique to establish a relationship between the different types of in-person real-estate property activities and days to pending amounts by processing training data comprising the in-person real-estate property activities and the days to pending amounts corresponding to each of the plurality of previously sold real-estate properties, the training being performed by:
retrieving a portion of the training data from a storage device, the portion of the training data comprising the in-person real-estate property activities of a given previously sold real-estate property of the plurality previously sold real-estate properties and a known days to pending amount of the given previously sold real-estate property;
extracting in-person real-estate property activities features from the training data for the given previously sold real-estate property;
utilizing the machine learning technique to estimate a days to pending amount for the given previously sold real-estate property based on the extracted in-person real-estate property activities features;
updating parameters of the machine learning technique to map the estimated days to pending amount for the given previously sold real-estate property to the known days to pending amount for the given previously sold real-estate property; and
providing, as a result of updating the parameters of the machine learning technique, a trained machine learning technique;
receiving initial real-estate property listing information representing different types of in-person real-estate property activities associated with a new real-estate property;
applying the trained-machine learning technique to the initial real-estate listing information to determine an initial days to pending amount for the new real-estate property;
receiving updated real-estate property listing information representing the different types of in-person real-estate property activities associated with the new real-estate property;
applying the trained machine learning technique to the updated real-estate listing information to determine a current days to pending amount for the new real-estate property;
determining a difference between the initial days to pending amount and the current days to pending amount; and
performing an action based on whether the difference between the initial days to pending amount and the current days to pending amount exceeds a days to pending threshold.

19. The system of claim 18, wherein the action comprises flagging the new real-estate property for review or automatically adjusting an asking price for the new real-estate property.

20. A non-transitory computer-readable medium comprising instructions stored thereon that are executable by at least one processor to cause a computing device to perform operations comprising:
receiving, by a server, real-estate property listing information representing different types of in-person real-estate property activities associated with a plurality of previously sold real-estate properties;

determining, for each of the plurality of previously sold real-estate properties, a known days to pending amount indicating a measure of time between when a respective one of the plurality of real-estate properties was listed and when the respective one of the plurality of real-estate properties was sold;

training a machine learning technique to establish a relationship between the different types of in-person real-estate property activities and days to pending amounts by processing training data comprising the in-person real-estate property activities and the days to pending amounts corresponding to each of the plurality of previously sold real-estate properties, the training being performed by:

retrieving a portion of the training data from a storage device, the portion of the training data comprising the in-person real-estate property activities of a given previously sold real-estate property of the plurality previously sold real-estate properties and a known days to pending amount of the given previously sold real-estate property;

extracting in-person real-estate property activities features from the training data for the given previously sold real-estate property;

utilizing the machine learning technique to estimate a days to pending amount for the given previously sold real-estate property based on the extracted in-person real-estate property activities features; and updating parameters of the machine learning technique to map the estimated days to pending amount for the given previously sold real-estate property to the known days to pending amount for the given previously sold real-estate property; and providing, as a result of updating the parameters of the machine learning technique, a trained machine learning technique;

receiving, by the server, initial real-estate property listing information representing different types of in-person real-estate property activities associated with a new real-estate property;

applying the trained machine learning technique to the initial real-estate listing information to determine an initial days to pending amount for the new real-estate property;

receiving updated real-estate property listing information representing the different types of in-person real-estate property activities associated with the new real-estate property;

applying the trained machine learning technique to the updated real-estate listing information to determine a current days to pending amount for the new real-estate property;

determining a difference between the initial days to pending amount and the current days to pending amount and performing an action based on whether the difference between the initial days to pending amount and the current days to pending amount exceeds a days to pending threshold.

\* \* \* \* \*